March 21, 1967 — R. W. REICH — 3,310,690
PERMANENT MAGNET RESONATOR
Filed July 30, 1964
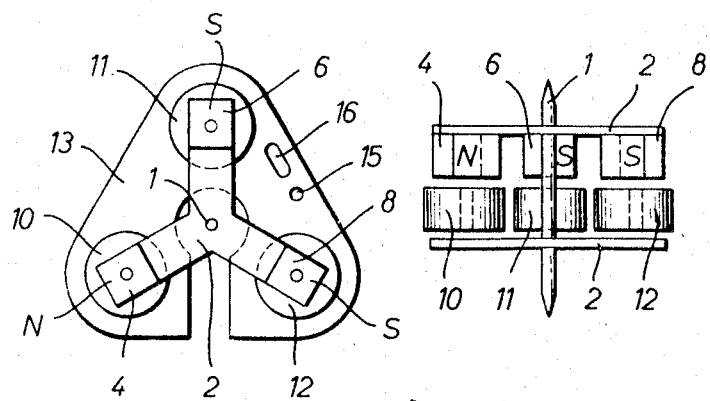
FIG. 1
FIG. 2
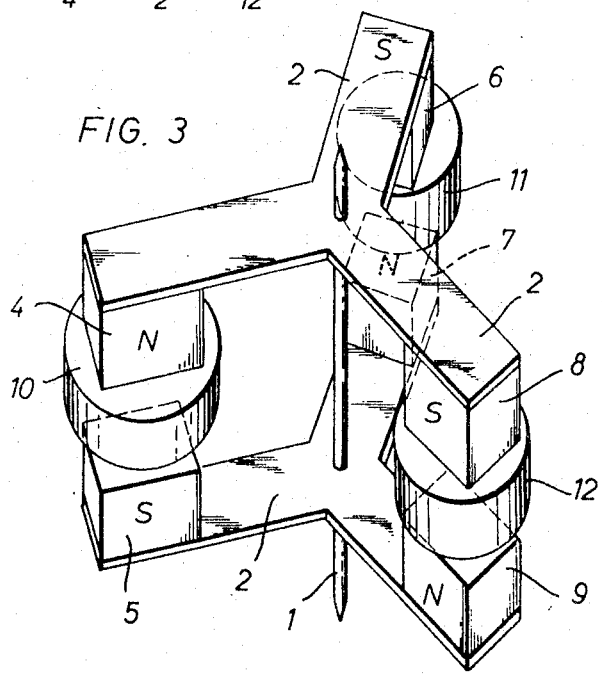
FIG. 3

United States Patent Office 3,310,690
Patented Mar. 21, 1967

3,310,690
PERMANENT MAGNET RESONATOR
Robert Walter Reich, Merzhauserstr. 143,
Freiburg im Breisgau, Germany
Filed July 30, 1964, Ser. No. 386,236
Claims priority, application Germany, Oct. 9, 1963,
R 36,324
1 Claim. (Cl. 310—36)

This invention relates to electronic clocks. More particularly, it relates to impelling and pulse control means for an electronic clock having a rotary pendulum or balance wheel and, as such, constitutes an improvement over U.S. Patent No. 3,040,225.

Electronic clocks are known comprising a transistor and driving and exciting coils wound concentrically about one another. In such a system, a rotary pendulum or balance wheel is provided with a pair of magnets extending above and below the coils. As the magnets enter the exciting coil which controls the transistor, a voltage is induced in the coil within the closed magnetic field between the two magnets. The driving coil then repels or drives the magnets of the pendulum depending on how it is wired.

The disadvantages of such an arrangement are several. The principal disadvantage resides in the fact that only a very small exciting power is obtainable from the magnet system. Accordingly, clocks using such an arrangement are extremely sensitive to both voltage and temperature. The exciting power is not sufficient at low operating voltages to fully modulate the transistor while the power put out by the driving coil is increased by temperature increases. It has been proposed to minimize this temperature and voltage sensitivity by using eddy current brakes. Basically, however, this merely means that the power of the driving system is reduced at high operating voltages to such an extent that it corresponds approximately to the power at low voltages. This requires a much greater expenditure of energy, which has to be taken from the battery or other energy source. This practice has the further disadvantage that it can not function perfectly because the positioning has to be precisely 180 degrees in relation to the null point. The eddy current brake actually works, therefore, only at very great oscillating amplitudes and high speeds at which the magnet pair swings past this brake.

Another disadvantage to this type of system for electronic clocks is that it is not self starting. Thus, the system or arrangement requires a special starting system which turns the rotating pendulum or balance wheel through 120 to 180 degrees whereby a sufficiently high excitation starting impulse is developed. Still further, in such an arrangement, balancing counterweights must be associated with the rotating pendulum or balance wheel. When designing the electronic circuit of the system, the current consumption required to drive such counterweights must be taken into consideration. This kind of arrangement, moreover, results in greater friction losses because of the bearings required to carry the very high balance wheel weights. The efficiency over extended periods of time of this type of system, therefore, leaves much to be desired. Additionally, such an arrangement presents manufacturing difficulties. When the coils are wound concentrically around one another, different wire sizes have to be used for the driving and exciting coils. Because of this, large numbers of rejects in commercial production are common. Furthermore, additional circuit components are necessary to suppress vibrating tendencies. To this end, appropriately large condensers are connected across the driving coil, or from the collector of the transistor to the base thereof, or across the exciting coil, any of which results in a loss of power.

There has continued to remain, therefore, a demand for an impelling and pulse control system for electronic clocks which is not subject to these various disadvantages. It is a principal object of this invention to provide such a system. It is a particular object of this invention to provide an impelling and pulse control system that is not affected by temperature and voltage variations.

These objects have been met in accordance with the present invention by employing an impelling and pulse control system for electronic clocks having a driving coil in the null position of the rotary pendulum or balance wheel with an exciting coil disposed at 120 degrees on etiher side of the null point. A magnetic pair, or the equivalent, is provided for each coil with the polarization of the exciting magnet being in the direction of the coil axes and equal and opposite to that of the driving magnets. In the present system the exciting coils are connected in series with a blocking diode positioned in the base circuit of the transistor, preferably in the conductor connecting the two coils in series. The two exciting coils are so dimensioned that the induced voltage is sufficient, even at the lowest permissible operating voltages and temperatures, for complete modulation of the transistor, and the electrical values are so balanced that when the driving magnet of opposite polarity passes one coil with an exciting magnet passing the other coil, the voltages thus induced cancel one another. To compensate the temperature-dependent residual current, a resistor having a value approximately on the order of the input impedance of the transistor is placed in the circuit from the base to the emitter. The magnet system of the present impelling and pulse control arrangement may comprise small magnets, magnetized in the direction of the coil axis, mounted on the double holder of the balance wheel above and below the coils. Alternatively, single large magnets may be employed either above or below the coils in combination with an iron magnetic shunt piece in the other plane. It is very expedient to mount the coils and the transistor circuit on a common mounting which may be of plastic or the like and which is fastened to a holding plate or any other appropriate part of the mechanism. This mounting may simultaneously be employed as the support for a printed circuit.

The drive and control system of the present invention is further described by reference to the drawing in which:
FIGURE 1 is a top view of one embodiment of the system;
FIGURE 2 is a side view of a second embodiment; and
FIGURE 3 is a perspective of the embodiment of FIGURE 1.

Referring to the drawing, like reference numerals in each figure indicate like elements. Reference numeral 1 indicates a shaft to which are secured top and bottom holding plates 2 for the balance wheel. Mounted on plates 2 are magnets 4, 5 for the driving coil 10 and magnets 6, 7 and 8, 9 for exciting coils 11 and 12. Driving coil 10 and exciting coils 11 and 12 are mounted on mounting 13 (see FIGURE 1) of plastic or other suitable material. Mounting 13 may also expediently carry a printed circuit, not shown, together with transistor 15 and diode 16. The embodiment of FIGURE 2 illustrates the alternate arrangement comprising single larger magnets above the coils and an iron magnetic shunt, not shown, below the coils.

In the impelling and pulse control system of the present invention, only one impulse is given to each side when in the null position. Referring to FIGURE 3, when in the null position, the driving magnet pair is above and below the driving coil while, at the same time the two exciting magnet pairs are above and below the exciting coils. Upon the entry to or exit from the exciting coils, one impulse is produced in the exciting coils by each of the magnets and two impulses add up and open the transistor fully. Because of the completely separate arrangement of the exciting and driving coils, these coils can be so wound and designed that, by two adding impulses, self-induction voltages are produced which fully open the transistor under all circumstances in the flat, rising portion of the sine curve. In this manner, a nearly rectangular, steep impulse develops, since any further increase of the induction voltage cannot open the transistor any further. A comparison of the oscillographic curves would clearly show this sharp, short-duration impulse in comparison with the purely sinusoidal impulse in the other systems. Whereas in other systems a starter has to be provided which must turn the balance wheel almost 180 degrees to start it, even the jar that occurs when the battery is inserted, or the setting of the hands, is sufficient to start a clock employing the instant impelling and pulse control system. The deflection need only be great enough to enable the magnet to barely depart from the coil. However, when the transistor is fully opened by the induction voltage itself, no greater amount of current can flow in the driving coil because of temperature rise.

The current in the overall circuit can indeed increase, but an increase of the current in the driving coil is impossible. To compensate the temperature-dependent residual current, the resistance is connected in the circuit between base and emitter. The same situation prevails with the voltage-dependence. If the transistor, even at low operation voltages, has already been opened by the high induction voltage of the exciting coils at the base, no higher driving current can be produced by voltage increase. In this simple manner, the circuit arrangement is so designed that temperature and voltage dependence are substantially compensated. The transistor is modulated even at very low values, and is overmodulated at higher values. The overmodulation, however, cannot result in a higher current, since the ohmic resistance of the driving coil practically limits this current.

Additional impulses to 180 degrees are not possible, as they are in various other magnet systems, since the impulses combine only upon simultaneous action by the exciting magnets of both exciting coils, while they cancel upon action by the driving magnet pair with an exciting magnet pair. In this manner, perfect operation from the null point to each side is assured without additional impulses, even at amplitudes of more than 270 degrees. The blocking diode that lies in the base circuit, furthermore, also has an inhibiting effect on impulses which might occur in opposite direction.

A further advantage of the system of the instant invention is that three entirely equal coils can be wound and used. In this manner, it is possible to insert the coils directly into a simple holder with a printed circuit. Due to the symmetrical construction, no additional compensating weights are present, so that no power loss can occur due to the acceleration of unnecessary weights.

I claim:

In an impelling and pulse control system for electronic clocks comprising a rotary pendulum, three coils disposed around the axis of said pendulum consisting of a single driving coil positioned at the extreme end of the arc of rotation of said pendulum and two exciting coils positioned so as to be alternately energized by said pendulum and thereby correspondingly controlling said driving coil, the improvement comprising an arrangement in which the two exciting coils are positioned at 120° on either side of the driving coil and in which pairs of permanent magnets are provided on said pendulum extending above and below said coils in such a manner that at the extreme end of the arc of rotation of said pendulum the polarities of the magnets above the driving and exciting coils are north and south, respectively, and the polarities of the magnets below the driving and exciting coils are south and north, respectively, whereby the magnet flow through the two exciting coils is equalized but opposite in direction to the flow through the driving coil.

References Cited by the Examiner
UNITED STATES PATENTS

| | | | |
|---|---|---|---|
| 2,895,095 | 7/1959 | Guyton | 310—36 X |
| 3,002,138 | 9/1961 | Byrnes et al. | 318—132 |
| 3,002,139 | 9/1961 | Byrnes | 318—132 |
| 3,095,528 | 6/1963 | Dome | 310—36 X |

MILTON O. HIRSHFIELD, *Primary Examiner.*

D. F. DUGGAN, *Assistant Examiner.*